US010403959B2

(12) United States Patent
Johnson et al.

(10) Patent No.: US 10,403,959 B2
(45) Date of Patent: Sep. 3, 2019

(54) THIN WIRE ANTENNA FOR CONTROL DEVICES, FOR EXAMPLE, FOR CONTROL OF OR INCLUSION IN A LUMINAIRE

(71) Applicant: ABL IP Holding LLC, Conyers, GA (US)

(72) Inventors: John Johnson, Flowery Branch, GA (US); John Peter Roquemore, III, Suwanee, GA (US); Matthew Clement, Loganville, GA (US); Jose Gonzalez, Atlanta, GA (US)

(73) Assignee: ABL IP Holding LLC, Conyers, GA (US)

( * ) Notice: Subject to any disclaimer, the term of this patent is extended or adjusted under 35 U.S.C. 154(b) by 180 days.

(21) Appl. No.: 15/213,693

(22) Filed: Jul. 19, 2016

(65) Prior Publication Data

US 2018/0026329 A1 Jan. 25, 2018

(51) Int. Cl.
*F21V 3/00* (2015.01)
*H01Q 1/24* (2006.01)
(Continued)

(52) U.S. Cl.
CPC ................. *H01Q 1/22* (2013.01); *F21V 3/00* (2013.01); *F21V 23/009* (2013.01); *H01Q 1/2283* (2013.01); *H01Q 1/24* (2013.01); *H01Q 13/20* (2013.01); *H05B 37/0272* (2013.01); *F21Y 2115/10* (2016.08)

(58) Field of Classification Search
CPC ...... H01Q 1/06; H01R 9/0518; F21V 23/005; F21V 23/006; F21V 23/009
See application file for complete search history.

(56) References Cited

U.S. PATENT DOCUMENTS 5,448,256 A 9/1995 Ohashi et al.
7,741,782 B2 6/2010 Vermeulen
(Continued)

FOREIGN PATENT DOCUMENTS

GB 2490119 A * 10/2012 ......... H05B 37/0218

OTHER PUBLICATIONS

Non Final Office Action for U.S. Appl. No. 15/213,697, dated Aug. 13, 2018, 16 pages.
(Continued)

*Primary Examiner* — Jessica Han
*Assistant Examiner* — Amal Patel
(74) *Attorney, Agent, or Firm* — RatnerPrestia

(57) ABSTRACT

An antenna assembly includes a radio frequency (RF) connector connected to a first end of a coaxial cable and a wire antenna attached to a second end of the coaxial cable. The wire antenna may be made of a shape memory alloy, such as nitinol. Examples of RF connectors include U.FL, IPEX, IPAX, IPX, AMC, MHF and UMCC connectors that allow the wire antenna to be removably attached to a printed circuit board (PCB) of a lighting control device and to avoid hardwiring the antenna to the PCB. The device that includes the antenna assembly may be incorporated into a luminaire for wireless control of the luminaire. The lighting control device may be installed within the luminaire, such that the wire antenna is positioned between a light source and a diffuser. A number of such luminaries may be combined to provide an intelligent lighting system.

12 Claims, 6 Drawing Sheets

(51) Int. Cl.

| | |
|---|---|
| ***F21V 23/00*** | (2015.01) |
| ***H01Q 13/20*** | (2006.01) |
| ***H05B 37/02*** | (2006.01) |
| ***F21Y 115/10*** | (2016.01) |
| ***H01Q 1/22*** | (2006.01) |

(56) References Cited

U.S. PATENT DOCUMENTS

| | | | | |
|---|---|---|---|---|
| 8,059,060 | B2 | 11/2011 | Barter et al. | |
| 8,172,613 | B1 | 5/2012 | Chen et al. | |
| 2004/0189543 | A1 | 9/2004 | Jordan et al. | |
| 2005/0266727 | A1 | 12/2005 | Yamaguchi et al. | |
| 2013/0249757 | A1 | 9/2013 | Leung et al. | |
| 2014/0125250 | A1 | 5/2014 | Wilbur | |
| 2014/0168020 | A1* | 6/2014 | Stoytchev | F21V 33/0004 343/721 |
| 2015/0127260 | A1 | 5/2015 | Mulller | |
| 2015/0327349 | A1* | 11/2015 | Lee | F21K 9/232 362/294 |

OTHER PUBLICATIONS

Canadian Office Action for Canadian Application No. 2,973,705, dated Aug. 8, 2018, 3 pages.

Non Final Office Action for U.S. Appl. No. 16/003,451, dated Oct. 26, 2018, 17 pages.

Final Office Action for U.S. Appl. No. 15/213,697, dated Jan. 2, 2019—21 pages.

Canadian Office Action for Canadian Application No. 2,973,838, dated Mar. 26, 2019, 4 pages.

Notice of Allowance for U.S. Appl. No. 15/213,697, dated Mar. 19, 2019, 10 pages.

Canadian Office Action for Canadian Application No. 2,973,705, dated May 3, 2019, 4 pages.

Final Office Action for U.S. Appl. No. 16/003,451, dated Jun. 13, 2019, 33 pages.

* cited by examiner

THIN WIRE ANTENNA FOR CONTROL DEVICES, FOR EXAMPLE, FOR CONTROL OF OR INCLUSION IN A LUMINAIRE

CROSS-REFERENCE TO OTHER APPLICATION

The present subject matter may be related to subject matter disclosed in U.S. patent application Ser. No. 15/213,697, filed concurrently herewith entitled "RF CONNECTOR AND ANTENNA ASSEMBLY FOR CONTROL DEVICES, FOR EXAMPLE, FOR CONTROL OF OR INCLUSION IN A LUMINAIRE," the entire contents of which are incorporated herein by reference.

TECHNICAL FIELD

The present subject matter relates to techniques and equipment to make and/or use a thin wire antenna, for example, for wireless control devices, as well as to control devices, luminaries and other equipment that may incorporate the thin wire antenna.

BACKGROUND

Devices that use radio frequencies (RF) are highly regulated by the government authorities, such as the Federal Communications Commission (FCC) in the United States, to ensure that the wireless spectrum may be shared by multiple private and government entities without interfering with each other. Depending on the specific frequency bands, the FCC will require standards associated with one or more of output power, harmonics, occupied bandwidth, as well as confirming the intended function and application of the device are compliant, for example.

Transmitters may operate at different frequencies, depending on the availability of frequency bands that are relatively free of interference. The antenna for a transmitter or transceiver operating in a particular frequency band typically has a length approximately equal to one-quarter of the wavelength of the transmission frequency when connected directly to a printed circuit board (PCB). The PCB is in general the other quarter wave of a half wave resonant device. In order to comply with government regulations, manufacturers design several variants of the same product having different hard wired antennas depending on the RF requirements of a particular location or application. The antennas may also be subject to damage during manufacture or installation of equipment in which the antennas are installed, thus affecting performance of the antennas and creating another difficulty for manufacturers.

Traditional luminaries can be turned ON and OFF, and in some cases may be dimmed, usually in response to user activation of a relatively simple input device connected to lines supplying power to the luminaries. Often traditional luminaries are controlled individually or as relatively small groups at separate locations. More sophisticated lighting control systems automate the operation of the luminaries throughout a building or residence based upon preset time schedules, occupancy, and/or daylight sensing. Such lighting control systems receive sensor signals at a central lighting control panel, which responds to the received signals by deciding which, if any, relays, switching devices, and/or dimming ballasts to drive in order to turn on or off and/or adjust the light levels of one or more luminaries. More recently, lighting control systems have begun to utilize wireless communications in support of monitoring and luminaire control operations. Migration to wireless communication, however, raises implications regarding the requirements of radio frequency operations such as those outlined above, for example, how best to implement antennas optimized for communication on a particular frequency band in a manner suitable for implementation in a lighting system.

Thus, there is a need for improved antenna configurations, particularly that may be suitable for use in control devices of or lighting fixtures or in other wireless intelligent lighting system elements that rely on the use of the antennas for wireless lighting system communications.

SUMMARY

The concepts disclosed herein improve wireless antenna arrangements, particularly those for wireless communications for lighting systems.

In one example of a concept disclosed herein, an antenna assembly includes a radio frequency (RF) connector connected to a first end of a coaxial cable and a wire antenna attached to a second end of the coaxial cable. The wire antenna may include a shape memory alloy.

In examples of this concept, the shape memory alloy is nitinol, and the RF connector may be selected from the group consisting of a U.FL, IPEX, IPAX, IPX, AMC, MHF and UMCC connector that may be removably attached to a printed circuit board.

In another example of a concept disclosed herein, a luminaire has a light source, a diffuser, and a wireless lighting control device. The lighting control device includes a wireless transceiver and an antenna assembly having a wire antenna coupled to the transceiver. The wire antenna is positioned within the luminaire between the light source and the diffuser.

One or more of the luminaries may be combined within an intelligent lighting system.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1B:
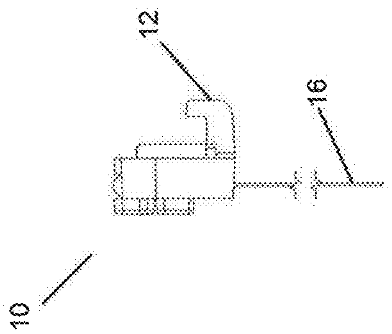
FIG. 1B is a side view of the antenna assembly of FIG. 1A.
Figure 1A:
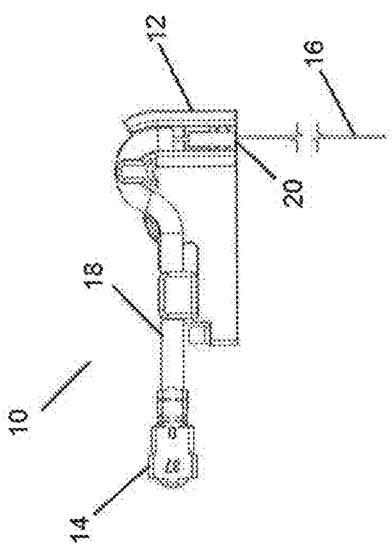
FIG. 1A is a top plan view of an antenna assembly according to a first example implementation.
Figure 1C:
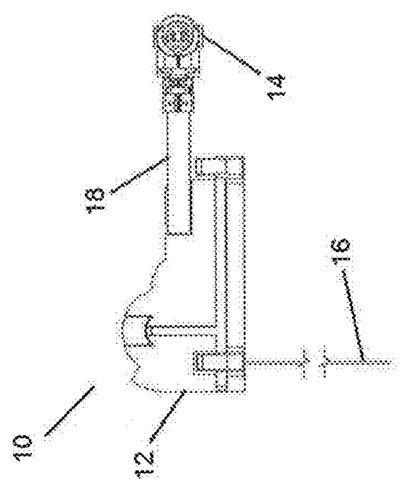
FIG. 1C is a bottom view of the antenna assembly of FIG. 1A.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Intelligent lighting systems that communicate with each other wirelessly via the electromagnetic spectrum use antennas to transmit and receive communications. Implementation of antennas in lighting and other similar systems raises some challenges. For example, it may be desirable to implement an RF antenna in a luminaire at a location that does not detract from the aesthetics of the luminaire once installed in a ceiling or the like. However, the antenna configuration should minimize or avoid attenuation of the RF to/from the antenna, for example, by metal components of the luminaire. As noted, longer wavelength operations may dictate a longer antenna for optimum performance, but the longer antenna is harder to hide in or around a luminaire with a metal housing without degrading RF performance. Examples discussed below provide a new antenna design suitable for RF communications, e.g. for monitoring and/or control communications. Examples also encompass arrangements optimized for lighting applications, for example, for use in a luminaire so as to provide adequate RF performance yet avoid adverse effects on lighting performance (e.g. produce minimal shadow) and adverse effects on the aesthetics of the lighting equipment.

As noted, the antenna for a transmitter or transceiver operating in a particular frequency band typically has a length approximately equal to one-quarter of the wavelength of the transmission frequency. These antennas are often soldered directly to a printed circuit board. In order to comply with government regulations, manufacturers design several variants of the same product having different hard wired antennas depending on the RF requirements of a particular location or application. The antennas may also be subject to damage during manufacture or installation of the luminaries in which the antennas are installed, thus affecting performance of the antennas and creating another difficulty for manufacturers. Implementation for lighting and other applications may also be improved by further advances discussed below as to the structures utilized to attach, connect and/or mount an antenna to circuitry of wireless communication device, such as a wireless lighting control device.

Although some or all of the concepts discussed below may be advantageous in other non-lighting applications, further discussions will concentrate on applications in lighting systems, for example with wireless communications to monitor and/or control operations of luminaries.

For that lighting related further discussion, the term "luminaire" is intended to encompass essentially any type of device that processes power to generate light, for example, for illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition light for an organism. A luminaire, for example, may take the form of a table lamp, ceiling light fixture or other lighting device that incorporates a source, where the source by itself contains no intelligence or communication capability (e.g. LEDs or the like, or lamp ("regular light bulbs") of any suitable type). Alternatively, a lighting device or luminaire may be relatively dumb but include a source device (e.g. a "light bulb") that incorporates the intelligence and communication capabilities described herein. In most examples, the luminaire(s) illuminate a service area to a level useful for a human in or passing through the space, e.g. regular illumination of a room or corridor in a building or of an outdoor space such as a street, sidewalk, parking lot or performance premises served by a lighting system may have other lighting purposes, such as signage for an entrance or to indicate an exit. Of course, the luminaries may be configured for still other purposes, e.g. to benefit human or non-human organisms or to repel or even impair certain organisms or individuals.

As outlined above, each luminaire includes a light source. The light source may be any type of light emitting unit, including but not limited to light emitting diodes (LEDs), incandescent or fluorescent lamps, halogen or halide lamps, neon tubes, etc. In the examples described herein, the luminaries also have smart capabilities. For example, the luminaries include or connect to an associated lighting control device that has a processor as well as one or more radio frequency (RF) transceivers to perform wireless communications with other luminaries and other wireless lighting control devices (e.g. Wall Switches, Sensors, etc.). The lighting control device included in luminaries utilize thin wire antenna assemblies as described in examples below. To work with and control such luminaries, a wall switch or sensor type lighting control device typically includes a compatible RF transceiver and possibly a thin wire antenna assembly as described in examples below. The wall switch or sensor type lighting control device may also include a processor, memory and firmware or other programming to configure the device to operate as outlined herein. The wireless communication capability may extend to a gateway or other access point for communications outside the premises. Alternatively or in addition, the wireless communication capability may enable the lighting control device(s) to communicate with other devices at the premises, such as mobile devices of technicians or occupants.

The premises may be any location or locations serviced for lighting and other purposes by a system of the type described herein. Most of the examples discussed below focus on indoor building installations, for convenience. Hence, such a system may provide lighting in a number of service areas in or associated with a building, such as various rooms, hallways, corridors or storage areas of a building. Any building forming or at the premises, for example, may be an individual or multi-resident dwelling or may provide space for one or more enterprises and/or any combination of residential and enterprise facilities. A premises may include any number of such buildings; and, in a multi-building scenario, the premises may include outdoor spaces and lighting in areas between and around the buildings, e.g. in a campus configuration. The system may include any number of luminaries and lighting control devices arranged to illuminate each area of the particular premises.

The lighting control devices in a system such as outlined above utilize wireless communications in one or more RF bands. For those communication purposes, each wireless enabled lighting control device will have one or more antennas. Implementation of antennas for effective wireless communication in lighting equipment raises various technical concerns, examples of which are outlined above.

The various examples disclosed herein relate to an antenna assembly that includes a thin wire attached to an RF connector. The RF connector may be removably attached to a printed circuit board of a lighting control device, thereby allowing a manufacturer to easily exchange antennas without requiring replacement of both the circuit board and antenna. This allows a manufacturer to more easily adjust the band in which the device must operate to comply with local regulations.

The lighting control devices that may use the thin wire antenna for RF wireless communication, as described herein, include wireless wall switches, wireless occupancy sensors, wireless sensors configured to detect other lighting related conditions (e.g. ambient light characteristics) or other types of control devices. Particular illustrated examples of the control devices are implemented within some or all of the system luminaries. Such lighting control devices in luminaries may include sensors (as in sensor and control module example in later drawings) or may be control devices/modules without sensors. Where the lighting control device is incorporated in a luminaire, the thin wire antenna may extend from a housing or module of the control device into a space within the luminaire that is between the light source and a diffuser or the like. Because it is relatively thin, the wire does not produce much of a shadow. Also, when located between the light source and diffuser, the antenna is not readily discernable to a person looking at the luminaire from a space illuminated by the luminaire.

Reference now is made in detail to the examples illustrated in the accompanying drawings and discussed below, in which like numerals identify the same or similar features. Referring to a first example in FIGS. 1A to 1E, an antenna assembly 10 includes an RF connector 14 that is attached to one end of a coaxial cable 18 and a thin wire antenna 16 attached to the opposing end of the coaxial cable 18. The impedance of the connector and of the coaxial cable are selected to match the output impedance of the transmitter and/or the input impedance of the receiver in a transceiver of a lighting control device or the like in order to reduce losses and distortion resulting from mismatched impedances. The antenna assembly 10 optionally also includes a support component 12 to retain the coaxial cable 18 and/or the thin wire antenna 16. The support component 12 may then be mounted onto a printed circuit board 22, as illustrated in FIG. 2A.

Figure 2A:
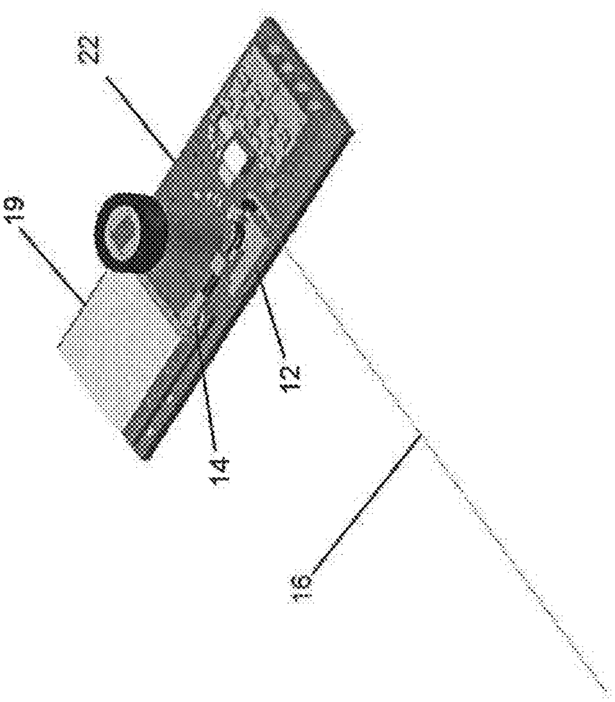
FIG. 2A is a top perspective view of the antenna assembly of FIG. 1A connected to a printed circuit board of a lighting control device with wireless communication capabilities, in this example, configured as a sensor and control module.
Figure 2B:
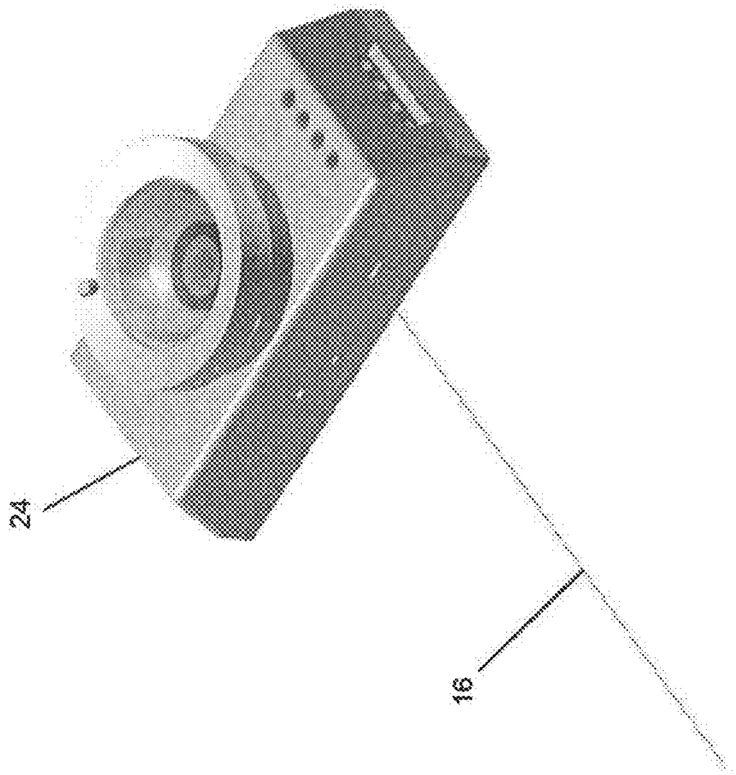
FIG. 2B is a top perspective view of an assembled sensor and control module that includes the antenna assembly of FIG. 1A.

As shown in FIG. 2A, the RF connector 14 is connected to a surface mount connector on the circuit board 22, adjacent to an integrated circuit 19 that may include a transmitter or transceiver. Connection of the cable and antenna to the board provides an appropriate RF coupling to the RF circuitry of the transmitter or transceiver included in the integrated circuit 19. In addition, the integrated circuit may include a controller that controls the operation of the luminaire as described above. The positioning of the antenna 16 at a distance from the integrated circuit 19 may help to reduce RF interference in the operation of the integrated circuit or to place the antenna at a location that is more convenient for mounting within the luminaire. FIG. 2B shows the assembly, including the circuit board and an enclosure 24 with the antenna extending from the assembly. To accommodate the antenna, the enclosure 24 desirably includes a notch from which the antenna extends.

As mentioned above, the RF connector may be configured to allow for repeated and relatively easy attachment and detachment from the printed circuit board. The RF connector in the example, therefore, is a surface-mounted device. That is configured to be connected to a similar surface mount device on the circuit board. The RF connector 14 coupled to the antenna 16 may be male or female and, conversely, the surface mount connector on the circuit board may be female or male. The RF connector may be selected from a variety of surface-mounted devices known to those of skill in the art, for example, from the group consisting of U.FL, IPEX, IPAX, IPX, AMC, MHF and UMCC connectors. The RF connector in the illustrated example is a U.FL connector and may be used for high-frequency signals up to 6 GHz.

By using a surface-mounted device as the RF connector, the antenna assemblies described herein may allow for both easy manufacture, modification, and repair. A surface-mounted device eliminates manual process steps, such as soldering, from the manufacturing process. Also, by providing an antenna that is connected to a printed circuit board via a surface-mounted device, a faulty or damaged antenna may be easily replaced, and several variants of the same or similar wireless lighting products operating in different frequency bands may be more easily fabricated to comply with local government regulations by simply exchanging the types of antennas used by the variants.

Referring again to FIGS. 1A to 1E, as noted above, the coaxial cable 18 is retained within a support component 12 including the connection between a female connector end of the coaxial cable and the antenna wire 16. The support component 12 may be provided in the form of an injection molded plastic retainer that is configured to position the antenna wire 16 in the correct orientation. The support component 12 may be molded into various forms depending on the overall design and space requirements of the control device. A conducting fastener 20, such as a metal crimp, may be used to physically connect the antenna wire 16 to the central conductor of the coaxial cable 18 in order to achieve an electrical contact. Various types of coaxial cable and crimping processes known to those of skill in the art may be used to manufacture the antenna assembly 10.

The use of a coaxial cable, such as in antenna assembly 10, may be used in certain applications in which the flexibility in the location and direction of the antenna is desired. The coaxial cable allows for more degrees of freedom in the orientation of the antenna, as well as providing strain relief for the antenna should the position of the antenna shift.

The thin wire antenna in the examples is formed of a shape memory alloy. By using a shape memory alloy, the thin wire antenna is less likely to lose its intended shape or be damaged during manufacture or installation. This is due to the superelastic properties of shape memory alloys. In a certain temperature range, a stress may be applied to the alloy to change its shape, but as soon as the stress is removed, the shape memory alloy will spontaneously return to its original shape. Because superelasticity occurs at a narrow temperature range just above the alloy's transformation temperature, it may be advantageous that a shape memory alloy is selected such that the expected operating temperature of the luminaire is above the transformation temperature of the alloy and within the range at which superelasticity occurs. The superelasticity temperature range of the thin wire antenna may be about −20 C to 85 C. A particular example of shape memory alloy is nitinol. As known by those of skill in the art, nitinol is an alloy of nickel and titanium, where the two elements are present in roughly equal atomic percentages. An example composition of nitinol alloy for use as a thin wire antenna according the disclosed examples comprises about 55 to 60 wt. % of Ni and 40 to 45 wt. % of Ti, as well as less than 1% of additional trace elements such as C, Co, Cu, Cr, Nb, Fe, O, N, and H.

As would be appreciated by one of ordinary skill in the art, the antenna is not limited to any specific dimensions. Any dimensions, i.e. length and diameter, may be used, as long as the antenna is provided with an appropriate length (e.g. one-quarter wavelength of the transmission frequency or approximately 75 mm+10 mm for a 900 MHz signal) and design frequency to transmit and receive various radio-frequency signals, such as Bluetooth, Bluetooth low-energy (BLE) or sub-GHz signal. The wire antenna may be of variable length. For example, the antenna may be made from any length of wire, e.g. 50 to 100 mm, depending on the frequency of operation of the wireless device. In the example implementations, the sub GHz signal may be in the range of 750 MHz to 930 MHz, more specifically in the range of 902 MHz to 928 MHz (one of the industrial, scientific and medical (ISM) bands in the United States). In some examples the same wire antenna may be associated with multiple transceivers to transmit and receive RF signals in different bands. Alternatively, each transceiver may be associated with a single wire antenna. The diameter of the antenna should also be sufficiently thick, so that the thin wire maintains relatively rigid and resists deformation. Examples of suitable diameters for the thin wire antenna may be in the range from 0.1 to 0.2 mm. The super-elastic properties of nitinol greatly reduce the risks of deformation and allow the thin wire antenna to be thinner than if wire not having these properties were used. Thus, the nitinol antenna is less obvious and, thus, more aesthetically pleasing.

Figure 4:
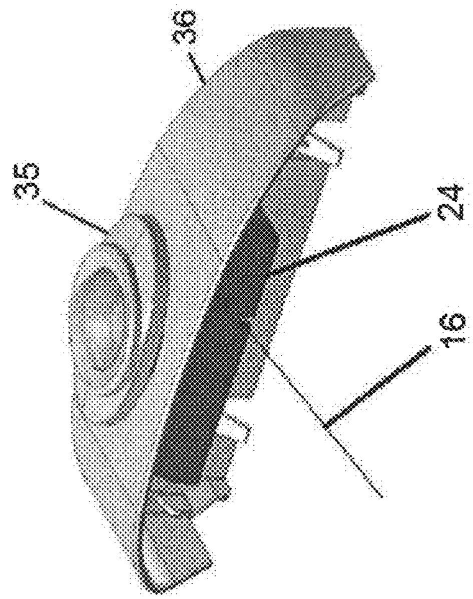
FIG. 4 is an assembled view of the sensor and control module of FIG. 3.
Figure 3:
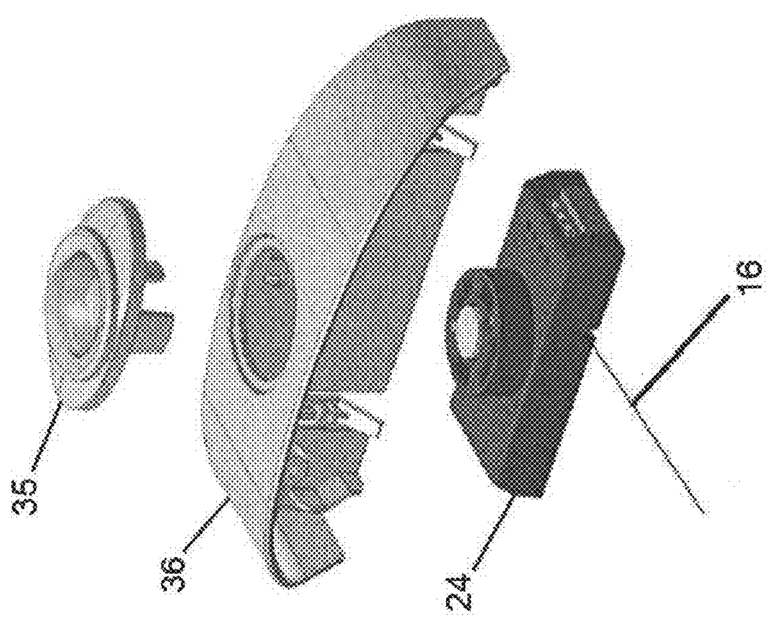
FIG. 3 is an exploded view of an end cap, a module and the sensor and control module of FIG. 2B for a luminaire.
Figure 5:
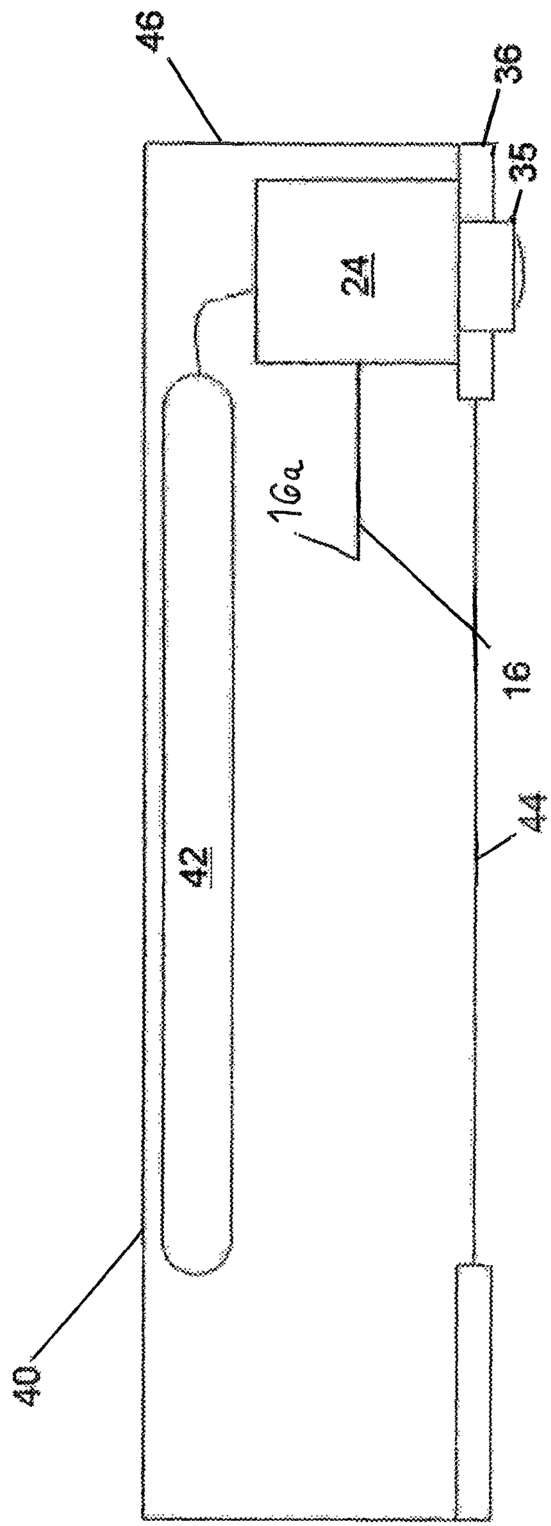
FIG. 5 is a partial cross-sectional view of an example of a luminaire comprising the sensor and control module of FIG. 3.

Referring to FIGS. 3 to 5, the sensor and control module as an example of a lighting control device in which the antenna assembly is used. In the example, the sensor and control module may be mounted to/within the end cap 36 of a luminaire 40. The sensor and control module may include a detachable Fresnel lens component 35 in order to attach the housing 24 to the end cap 36. The Fresnel lens component 35 is configured such that the Fresnel lens is exposed to the outside of the luminaire housing 46, while the remainder of the sensor and control module is within the housing 46. As seen in the example of FIGS. 3 to 5, a single antenna 16 extends from the sensor and control module housing 24; however, the sensor and control module may alternatively be provided with a plurality of antennas.

Because the antenna is provided in the form of a relatively short thin wire, the antenna 16 may be located between the diffuser 44 and the light source 42 of the luminaire 40, such that the antenna 16 is not conspicuous, but located in a position away from grounded metallic elements that may affect the performance of the antenna 16. The compact design of the sensor and control module allows for compliance with local safety regulations that may require the entire luminaire to be located within an electrical box. In other examples, one or more antennas may extend in any direction including outside of the luminaire housing 46, for example.

Figure 1E:
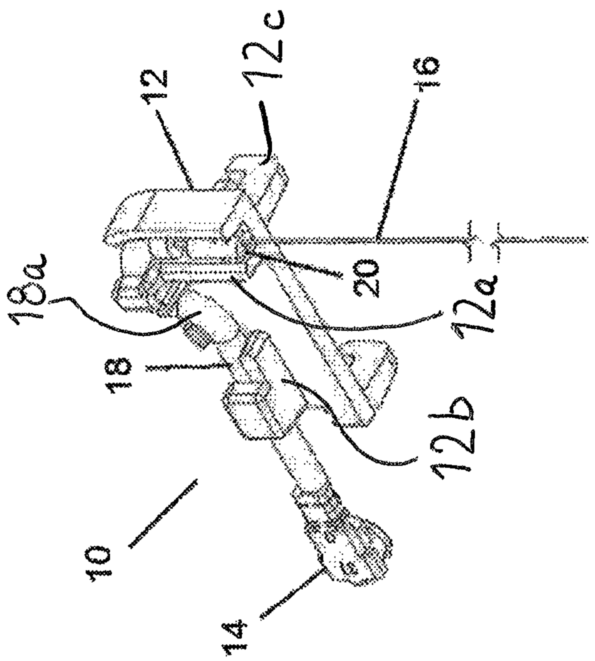
FIG. 1E is a top perspective view of the antenna assembly of FIG. 1A.
Figure 1D:
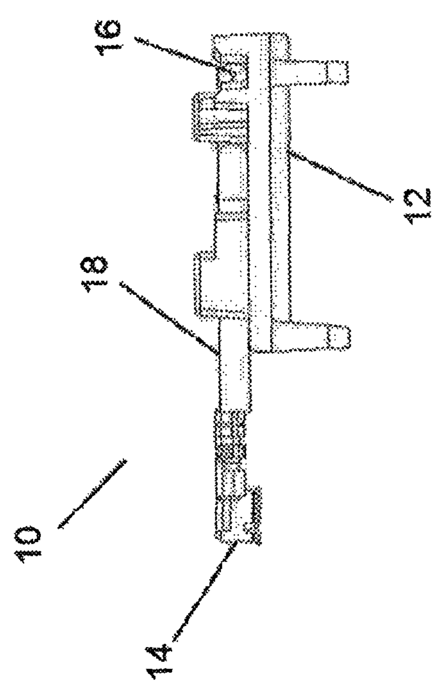
FIG. 1D is a front view of the antenna assembly of FIG. 1A.

As best shown in FIGS. 1E, 2A and 5, the wire antenna 16 is positioned between the light source 42 and the diffuser 44. The wire antenna 16 extends from the control module housing 24 of the wireless lighting control device to a free end 16*a* of the antenna 16. The support component 12 retains and orients at least one of the coaxial cable 18 and the wire antenna 16. The support component 12 includes a first portion 12*a* for retaining the wire antenna 16 and a second portion 12*b* for retaining the coaxial cable 18. The first portion 12*a* and the second portion 12*b* are configured to maintain the coaxial cable 18 and the wire antenna 16 in orthogonal directions (items 16 and 18 extend orthogonally in FIG. 1E). The conducting fastener 20 connects the wire antenna 16 to the coaxial cable 18, and the conducting fastener 20 is positioned within the first portion 12*a*. The second portion 12*b* is configured for maintaining the coaxial cable 18 in a bent orientation, as shown in FIG. 1E. See bend 18*a* of cable 18. The support component 12 also includes a mount 12*c* (FIG. 1E) for mounting to the printed circuit board 22 carrying the wireless transceiver (FIG. 2A).

Figure 6:
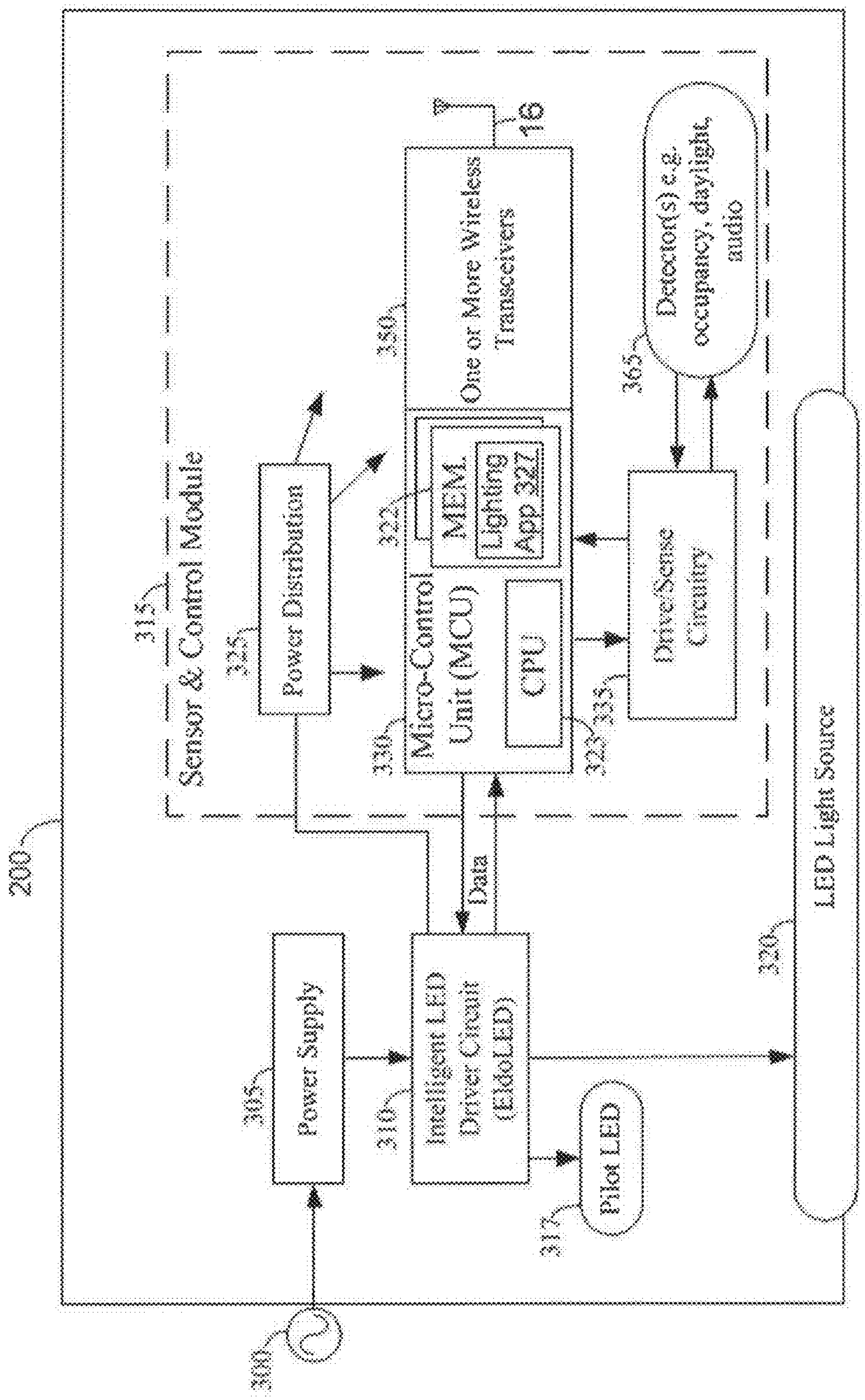
FIG. 6 is a functional block diagram of the elements of an example of a luminaire that includes a sensor and control module with the thin wire antenna.

One or more luminaries, such as the luminaire 200 illustrated in the functional block diagram of FIG. 6, may be combined within a wireless intelligent lighting system. Luminaire 200 is an integrated light fixture that generally includes a power supply 305 driven by a power source 300. Power supply 305 receives power from the power source 300, such as an AC mains, battery, solar panel, or any other AC or DC source. Power supply 305 may include a magnetic transformer, electronic transformer, switching converter, rectifier, or any other similar type of circuit to convert an input power signal into a power signal suitable for luminaire 200.

Luminaire 200 further includes an intelligent LED driver circuit 310, sensor/control module 315, and a light emitting diode (LED) light source 320. Intelligent LED driver circuit 310 is coupled to LED light source 320 and drives that LED light source 320 by regulating the power to LED light source 320 by providing a constant quantity or power to LED light source 320 as its electrical properties change with temperature, for example. The intelligent LED driver circuit 310 includes a driver circuit that provides power to LED light source 320 and a pilot LED 317. The pilot LED 317 may be included as part of the sensor/control module 315. Intelligent LED driver circuit 310 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 310 is manufactured by EldoLED.

LED driver circuit 310 can further include an AC or DC current source or voltage source, a regulator, an amplifier (such as a linear amplifier or switching amplifier), a buck, boost, or buck/boost converter, or any other similar type of circuit or component. LED driver circuit 310 outputs a variable voltage or current to the LED light source 320 that may include a DC offset, such that its average value is nonzero, and/or a AC voltage. The pilot LED 317 indicates the state of the luminaire 10, for example, during the commissioning and maintenance process.

For purposes of communication and control, luminaire 200 is treated as single addressable device that can be configured to operate as a member of one or more lighting control groups or zones. The luminaire 200 is line powered and remains operational as long as power is available.

Sensor/control module 315 includes power distribution circuitry 325, a micro-control unit (MCU) 330, drive/sense circuitry 335, and detector(s) 365. As shown, MCU 330 is coupled to LED driver circuit 310 and controls the light source operation of the LED light source 320. MCU 330 includes a memory 322 (volatile and non-volatile) and a central processing unit (CPU) 323. The memory 322 may include a lighting application 327 (which can be firmware) for both lighting control operations and commissioning, maintenance, and diagnostic operations. The power distribution circuitry 325 distributes power and ground voltages to the MCU 330, drive/sense circuitry 335, wireless transceivers 350, and detector(s) 365 to provide reliable operation of the various circuitry on the sensor/control module 315 chip.

In one lighting system, the sensor/control module 315 may include various components associated with the drive/sense circuitry 335 and detectors 365. For example, the printed circuit board for the sensor/control module 315 may include an LED and an indicator LED light pipe for indicating a status of the system and a photosensor light pipe to allow for the automatic adjustment of light emitted by the luminaire based on ambient conditions. Alternatively, the sensor/control module 315 may include a pyroelectric presence sensor, Fresnel lens, and light pipe to direct ambient light from the service area toward pyroelectric sensors on the circuit board. These sensors may be coupled to circuitry that analyzes differences between light incident on the sensors to identify individuals moving in the service area in order to determine when the service area is occupied.

As shown, the MCU 330 includes programming in the memory 322 which configures the CPU (processor) 323 to control operations of the respective luminaire 200, including the communications over the two different wireless communication bands via the one or more wireless transceivers 350. The programming in the memory 322 includes a real-time operating system (RTOS) and further includes a lighting application 327 which is firmware/software that engages in communications with the commissioning/maintenance application of user interface (not shown), such as a mobile device, over a commissioning network. The lighting application 327 programming in the memory 322 carries out lighting control operations over the lighting control network. The RTOS supports multiple concurrent processing threads for different simultaneous control or communication operations of the luminaire 200. In FIG. 6, in addition to the memory 322 and the CPU 323 of the MCU 330 itself, the one or more transceivers 350 may each include a separate memory (not shown) and a processor (not shown).

The micro-control unit 330 of the sensor/control module 315 may, for example, control light emitted by the lighting elements of the luminaire to implement a visible light communication (VLC) system. One example of a VLC system is a location system in which each luminaire broadcasts a respective identifier (ID) value that may be received by a user-operated mobile device (not shown) in the service area. The mobile device may then determine its position by associating the ID value with a location using either previously downloaded data or data accessible to the mobile device via a server computer (not shown).

The drive/sense circuitry 335 may provide power to the lighting elements and modulate the light provided by the lighting elements. For example, if the lighting elements are light emitting diodes (LEDs), the driver 335 converts available AC (or possibly DC) power to current to drive the LEDs to achieve a desired light level. Of course other types of light sources and corresponding driver circuits may be used.

The CPU 323 may be configured to control the operation of the lighting element via the driver/sense circuitry 335. The CPU 323 may also be coupled to communicate via the one or more transceivers to a communication interface (not shown). The communication interface provides communications functions for sending and receiving data via a wireless network operating in the service area.

The CPU 323 may be implemented via hardwired logic circuitry, or it may include a programmable processor such as a programmable central processing unit (CPU) of a microcontroller, microprocessor or the like. The memory 322 may be used for storing programming for execution by the CPU 323 and data, including the ID value.

The sensor/control module 315 may receive lighting commands via the network and provide device status to the network using the communications interface and the antenna 16. The signals and/or commands supplied may cause the sensor/control module 315 to modulate power supplied by the power supply 305 to the lighting elements according to the commands and/or processed data and thereby modulate the output of the light source 320 to turn the lighting elements on or off, to change the illumination characteristics of the lighting elements, or to broadcast data on the modulated light output of the lighting elements into the service area illuminated by the luminaire 200.

Luminaire 200 may also include a dual-band wireless radio communication interface system configured for two way wireless communication. In one example, luminaire 200 has one or more radio transceivers 350 for RF communications having an antenna 16 as described above. The one or more transceivers 350 may issue control operations on the lighting control network for any-to-many communication over a wireless communication band and/or control and systems operations information during luminaire operation and during control network operation. One or more of the radio transceivers 350 may also carry out commissioning, maintenance, and diagnostics of the lighting control network by point-to-point communication, over a different wireless communication band using the same antenna 16, of information other than the control and systems operations information, concurrently with at least some communications over the first wireless communication band.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A luminaire, comprising:

a light source;

a diffuser, a wireless lighting control device coupled to control operation of the light source, the lighting control device including a wireless transceiver and an antenna assembly having a wire antenna coupled to the wireless transceiver, wherein the wire antenna is positioned between the light source and the diffuser, and wherein the wire antenna extends from the wireless lighting control device to a free end of the antenna, a coaxial cable connected to the wire antenna, a support component that retains and orients at least one of the coaxial cable and the wire antenna, wherein the support component includes a first portion for retaining the wire antenna and a second portion for retaining the coaxial cable, wherein the first portion and the second portion are configured to maintain the coaxial cable and the wire antenna in orthogonal directions;

a conducting fastener for connecting the wire antenna to the coaxial cable, wherein the conducting fastener is positioned within the first portion; and a radio frequency (RF) connector connected to a first end of the coaxial cable, wherein the RF connecter provides the coupling to the wireless transceiver, and the wire antenna is attached to a second end of the coaxial cable.

2. The luminaire of claim 1 further comprising a housing and wherein the wireless lighting control device including the wire antenna are positioned within the housing.

3. The luminaire of claim 1, wherein the light source comprises a light emitting diode (LED) source.

4. The luminaire of claim 1, wherein the wire antenna has a length of 50 to 100 mm.

5. The luminaire of claim 1, wherein the wire antenna comprises a shape memory alloy.

6. The luminaire of claim 5, wherein the shape memory alloy is nitinol.

7. The luminaire of claim 1, wherein the RF connector is selected from the group consisting of a U.FL, IPEX, IPAX, IPX, AMC, MHF and UMCC connector.

8. The luminaire of claim 1, wherein the conducting fastener connects the wire antenna to the second end of the coaxial cable.

9. The luminaire of claim 1, wherein:

the wireless lighting control device further comprises a printed circuit board carrying the wireless transceiver, and the RF connector is removably attached to the printed circuit board.

10. A lighting system comprising one or more of the luminaries according to claim 1.

11. The luminaire of claim 1, wherein the support component includes a mount for mounting to a printed circuit board carrying the wireless transceiver.

12. The luminaire of claim 1, wherein the second portion is configured for maintaining the coaxial cable in a bent orientation.

* * * * *